No. 852,669. PATENTED MAY 7, 1907.
G. S. MAYN.
CULTIVATOR.
APPLICATION FILED AUG. 6, 1906.
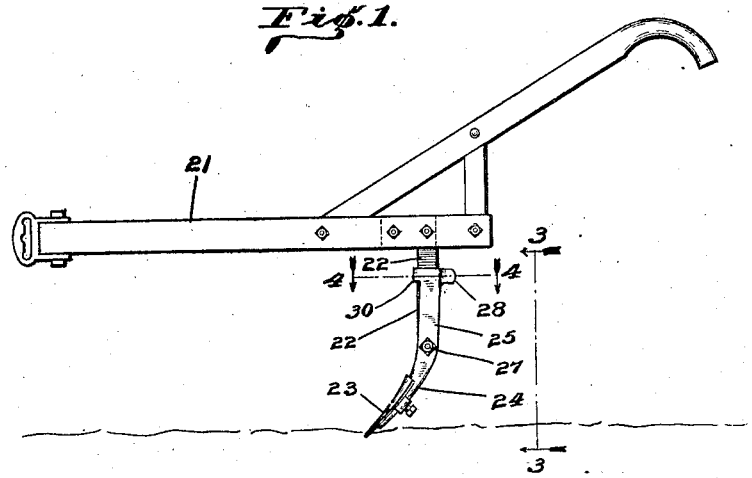
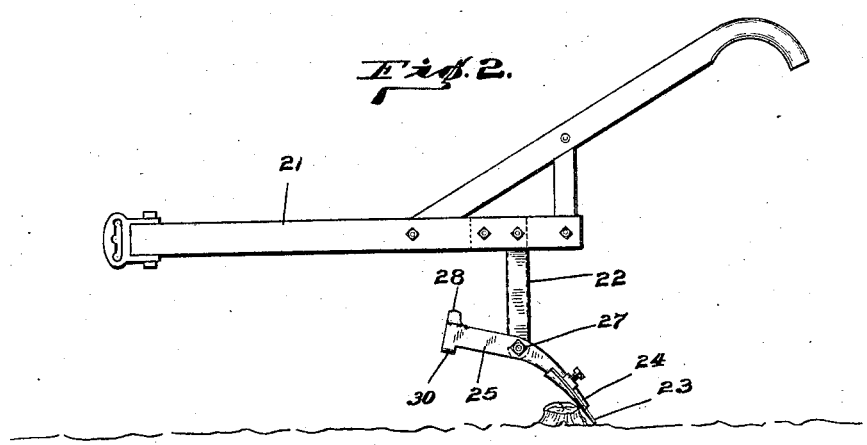
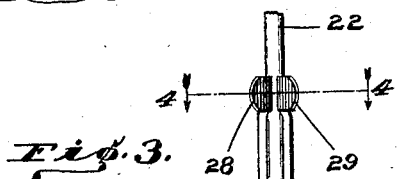
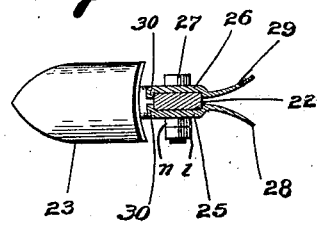
Witnesses
Frank A. Fahle
Thomas W. McMeans
Inventor
George S. Mayn
By
Bradford & Hood,
Attorneys.

UNITED STATES PATENT OFFICE.

GEORGE S. MAYN, OF TIPTON, INDIANA.

CULTIVATOR.

No. 852,669. Specification of Letters Patent. Patented May 7, 1907.

Application filed August 6, 1906. Serial No. 329,346.

*To all whom it may concern:*

Be it known that I, GEORGE S. MAYN, a citizen of the United States, residing at Tipton, in the county of Tipton and State of Indiana, have invented certain new and useful Improvements in Cultivators, of which the following is a specification.

My present invention relates to that class of plows or cultivators wherein the plow-point is adapted to yield and turn back upon striking an obstruction, thereby obviating the danger of breaking any of the operative parts.

Said invention consists in an improved means for holding the plow parts into operative position while the implement is performing its ordinary work, and still permitting this yielding, or turning backward, when the plow-point strikes an obstruction.

Referring to the accompanying drawing, which is made a part hereof, and on which similar reference characters refer to similar parts, Figure 1 is a side elevation of a plow or cultivator embodying my present invention, with the plow-point in its operative position; Fig. 2, a similar view with the plow-point turned back in the position it occupies immediately after coming in contact with an obstruction during the operation of plowing or cultivation; Fig. 3, an elevation, on an enlarged scale, as seen when looking in the direction indicated by the arrows from the dotted line 3 3 adjacent to Fig. 1, and Fig. 4, a detail horizontal sectional view at the point indicated by the dotted line 4 4 in Figs. 1 and 3.

This plow or cultivator, generally speaking, may be of any usual or approved form or construction. The form which I have illustrated is a very simple one, and is provided with but a single plow-point. It will be understood, of course, that most such implements have a plurality of plow-points; and the constructions of such implements are quite numerous.

Attached to the plow-beam 21 (in the construction shown) is a vertical bar 22. The plow-point 23 is mounted on a shank 24, and said shank has two spring arms 25 and 26 extending upwardly therefrom alongside the bar 22. These spring arms and the bar are pivotally united, as by a bolt 27. At the upper ends these spring arms extend rearwardly and terminate in latch-members 28 and 29 which partially embrace the bar 22, which provides a latching engagement between the spring arms and the bar. A preferred form for this is shown in Fig. 4. One or both of said spring arms also preferably carries a stop 30, which prevents them from swinging in the opposite direction to the plowing pressure (and thus throwing the plow-points out of proper position for work) as might happen in handling the implement, as in pulling it back into position for use.

The operation is as follows: The parts being brought into operative position, as shown in Fig. 1, the plowing or cultivating operation proceeds until the plow point strikes an obstruction, when the force will press the spring arms apart somewhat, and permit the plow-point and the parts by which it is carried to swing into the position shown in Fig. 2. After the obstruction is passed the parts are readily restored to position, as will be readily understood.

Any desired resistance may be provided for by the formation of the engaging parts, and the tension which is applied thereto by means of the bolt and its nut. By this means a strong degree of friction may be secured between the spring-arms and the downwardly extending bar. When the nut is turned up to the point desired, it may be secured by a lock-nut, as shown. The engaging ears may have any required degree of abruptness, and consequently arranged to resist any desired degree of force before being forced apart.

Having thus fully described my said invention, what I claim as new, and desire to secure by Letters Patent, is:—

1. The combination, in a plow or cultivator, of a suitable bar, and a plow-point-carrying member pivotally mounted thereon with spring arms extending up alongside said bar and having latching ears extending to behind and engaging said bar when the plow is in normal operative position but adapted to yield and permit the plow-point to swing backwardly when the latter strikes an obstruction, and also having a stop which prevents said arms from swinging in the opposite direction to the plowing pressure, substantially as shown and described.

2. The combination, in a plow or cultivator, of a suitable bar, and a plow-point-carrying member pivotally mounted thereon with spring arms extending up alongside said bar and having latching ears extending to behind and engaging said bar when the plow is in normal operative position but adapted to yield and permit the plow-point to swing backwardly when the latter strikes an obstruction, the pivot on which said arms are mounted being a bolt whereby the friction between the spring arms and the downwardly extending bar may be adjusted.

In witness whereof, I, have hereunto set my hand and seal at Indianapolis, Indiana, this 3rd day of August, A. D. one thousand nine hundred and six.

GEORGE S. MAYN. [L. S.]

Witnesses:
CHESTER BRADFORD,
THOMAS W. McMEANS.